(12) United States Patent
Kevenaar et al.

(10) Patent No.: US 9,384,338 B2
(45) Date of Patent: Jul. 5, 2016

(54) ARCHITECTURES FOR PRIVACY PROTECTION OF BIOMETRIC TEMPLATES

(75) Inventors: Thomas Andreas Maria Kevenaar, Eindhoven (NL); Antonius Hermanus Maria Akkermans, Eindhoven (NL); Pim Theo Tuyls, Eindhoven (NL)

(73) Assignee: Genkey Netherlands B.V., Eindhoven (NL)

( * ) Notice: Subject to any disclaimer, the term of this patent is extended or adjusted under 35 U.S.C. 154(b) by 1036 days.

(21) Appl. No.: 11/570,046

(22) PCT Filed: Jun. 1, 2005

(86) PCT No.: PCT/IB2005/051785
§ 371 (c)(1),
(2), (4) Date: Dec. 5, 2006

(87) PCT Pub. No.: WO2005/121924
PCT Pub. Date: Dec. 22, 2005

(65) Prior Publication Data
US 2007/0226512 A1    Sep. 27, 2007

(30) Foreign Application Priority Data

Jun. 9, 2004   (EP) .................................... 04102609
Sep. 10, 2004  (EP) .................................... 04104380

(51) Int. Cl.
*G06F 21/32* (2013.01)
*G06F 21/62* (2013.01)
(Continued)

(52) U.S. Cl.
CPC ............ *G06F 21/32* (2013.01); *G06F 21/6245* (2013.01); *G07C 9/00087* (2013.01);
(Continued)

(58) Field of Classification Search
CPC ............ H04L 2209/805; H04L 9/3278; G06F 2221/2117; G06F 2221/2143; G06F 21/32; G06F 21/6245; G07C 9/00087

USPC .................. 340/825, 5.1, 5.2, 5.51–5.53, 5.8, 340/5.81–5.86; 713/186, 194, 185, 182, 713/184, 183; 726/2, 3, 4, 9, 16, 17, 20; 382/115–118, 124–127
See application file for complete search history.

(56) References Cited

U.S. PATENT DOCUMENTS 6,111,977 A    8/2000  Scott et al.
6,202,151 B1   3/2001  Musgrave et al.
(Continued)

FOREIGN PATENT DOCUMENTS

EP   1385117 A    1/2004
WO   9933219      7/1999
(Continued)

OTHER PUBLICATIONS

J. P. Linnartz et al; "New Shielding Functions to Enhance Privacy and Prevent Misuse of Biometric Templates", Lecture Notes in Cmputer Science, Springer Verlag, NY, vol. 2688, 2003, pp. 393-402, XP002285062.
(Continued)

*Primary Examiner* — An T Nguyen
(74) *Attorney, Agent, or Firm* — Smith Gambrell & Russell LLP

(57) ABSTRACT

The present invention relates to a system and a method of verifying the identity of an individual by employing biometric data associated with the individual (603), wherein privacy of said biometric data (X, Y) is provided. A helper data scheme (HDS) is employed to provide privacy of the biometric data. The present invention is advantageous for number of reasons. First, processing of security sensitive information is performed in a secure, tamper-proof environment (601, 604, 606) which is trusted by the individual. This processing, combined with utilization of a helper data scheme, enables set up of a biometric system where the biometric template is available in electronic form only in the secure environment. Moreover, electronic copies of the biometric templates are not available in the secure environment permanently, but only when the individual offers her template to the sensor.

20 Claims, 3 Drawing Sheets

(51) Int. Cl.
*G07C 9/00* (2006.01)
*H04L 9/32* (2006.01)

(52) U.S. Cl.
CPC ...... *H04L9/3278* (2013.01); *G06F 2221/2117* (2013.01); *G06F 2221/2143* (2013.01); *H04L 2209/805* (2013.01)

(56) References Cited

U.S. PATENT DOCUMENTS

| | | | |
|---|---|---|---|
| 6,363,485 | B1 | 3/2002 | Adams et al. |
| 6,820,059 | B2* | 11/2004 | Wood ............... G06Q 10/10 705/4 |
| 7,047,204 | B1* | 5/2006 | Wood ............... G06Q 10/10 705/4 |
| 7,568,113 | B2* | 7/2009 | Linnartz ........ G11B 20/00086 380/278 |
| 7,620,818 | B2* | 11/2009 | Vetro ................ H04L 9/3231 382/115 |
| 8,312,289 | B2* | 11/2012 | Bruekers ........................ 713/186 |
| 8,410,902 | B2* | 4/2013 | Kevenaar ....... G06Q 20/40145 340/5.1 |
| 2002/0186838 | A1 | 12/2002 | Brandys |
| 2003/0197593 | A1 | 10/2003 | Siegel et al. |
| 2004/0172541 | A1* | 9/2004 | Ando ............... G06Q 20/341 713/176 |
| 2004/0255127 | A1* | 12/2004 | Arnouse ............. G06F 21/32 713/186 |
| 2005/0021983 | A1* | 1/2005 | Arnouse ............. G06F 21/32 713/186 |
| 2005/0039014 | A1* | 2/2005 | Sajkowsky .......... G06K 17/00 713/172 |
| 2005/0138392 | A1* | 6/2005 | Johnson ............. G06F 21/14 713/186 |
| 2006/0075255 | A1* | 4/2006 | Duffy ................. G06F 21/32 713/186 |
| 2006/0087950 | A1* | 4/2006 | Linnartz ........ G11B 20/00086 369/100 |
| 2006/0123239 | A1* | 6/2006 | Martinian ............ H04L 9/3231 713/186 |
| 2007/0180261 | A1* | 8/2007 | Akkermans ........ G06K 9/00885 713/186 |
| 2007/0220272 | A1* | 9/2007 | Campisi ........... G06K 9/00006 713/186 |
| 2007/0220273 | A1* | 9/2007 | Campisi ........... G06K 9/00006 713/186 |
| 2007/0226512 | A1* | 9/2007 | Kevenaar ............ G06F 21/32 713/186 |
| 2007/0288759 | A1* | 12/2007 | Wood ................. G06Q 20/341 713/186 |
| 2009/0201128 | A1* | 8/2009 | Campisi ........... G06K 9/00006 340/5.53 |
| 2009/0259852 | A1* | 10/2009 | Linnartz ......... G11B 20/00086 713/176 |
| 2009/0282259 | A1* | 11/2009 | Skoric ................. G06F 21/35 713/185 |
| 2010/0017618 | A1* | 1/2010 | Golic ................. G06K 9/00288 713/186 |
| 2010/0027784 | A1* | 2/2010 | Tuyls ................. H04L 63/061 380/44 |

FOREIGN PATENT DOCUMENTS

| | | |
|---|---|---|
| WO | 9965175 | 12/1999 |
| WO | 0055800 | 9/2000 |
| WO | 0065770 | 11/2000 |
| WO | 0127723 A | 4/2001 |
| WO | 03003169 | 1/2003 |
| WO | 2004006495 A | 1/2004 |

OTHER PUBLICATIONS

R. Pappu et al; "Physical One-Way Funtions", Science, American Association for the Advancement of Science, US, vol. 297, No. 5589, Sep. 2002, pp. 2026-2030, XP002285061.

E. Verbitskiy et al; "Reliable Biometric Authentication With Privacy Protection", Proc. of the 24th Symp. on Inf. Theory in the Benelux, Veldhoven, NL, 2003, pp. 125-132, XP002363934.

Bjorn Nordin; "Match-On-Card-Technology", Apr. 2004, Precise Biometrics, White Paper.

* cited by examiner

ARCHITECTURES FOR PRIVACY PROTECTION OF BIOMETRIC TEMPLATES

FIELD OF THE INVENTION

The present invention relates to a system and a method of verifying the identity of an individual by employing biometric data associated with the individual, wherein privacy of said biometric data is provided.

Authentication of physical objects may be used in many applications, such as conditional access to secure buildings or conditional access to digital data (e.g. stored in a computer or removable storage media), or for identification purposes (e.g. for charging an identified individual for a particular activity).

The use of biometrics for identification and/or authentication is to an ever-increasing extent considered to be a better alternative to traditional identification means such as passwords and pin-codes. The number of systems that require identification in the form of passwords/pin-codes is steadily increasing and, consequently, so is the number of passwords/pin-codes which a user of the systems must memorize. As a further consequence, due to the difficulty in memorizing the passwords/pin-codes, the user writes them down, which makes them vulnerable to theft. In the prior art, solutions to this problem have been proposed, which solutions involve the use of tokens. However, tokens can also be lost and/or stolen. A more preferable solution to the problem is the use of biometric identification, wherein features that are unique to a user such as fingerprints, irises, ears, faces, etc. are used to provide identification of the user. Clearly, the user does not lose or forget his/her biometric features, neither is there any need to write them down or memorize them.

The biometric features are compared to reference data. If a match occurs, the user is identified and can be granted access. The reference data for the user has been obtained earlier and is stored securely, e.g. in a secure database or smart card. In authentication, the user claims to have a certain identity and an offered biometric template is compared with a stored biometric template that is linked to the claimed identity, in order to verify correspondence between the offered and the stored template. In identification, the offered biometric template is compared with all stored available templates, in order to verify correspondence between the offered and stored template. In any case, the offered template is compared to one or more stored templates.

Whenever a breach of secrecy has occurred in a system, for example when a hacker has obtained knowledge of secrets in a security system, there is a need to replace the (unintentionally) revealed secret. Typically, in conventional cryptography systems, this is done by revoking a revealed secret cryptographic key and distributing a new key to the concerned users. In case a password or a pin-code is revealed, it is replaced by a new one. In biometric systems, the situation is more complicated, as the corresponding body parts obviously cannot be replaced. In this respect, most biometrics are static. Hence, it is important to develop methods to derive secrets from (generally noisy) biometric measurements, with a possibility to renew the derived secret, if necessary. It should be noted that biometric data is a good representation of the identity of an individual, and unauthenticated acquirement of biometric data associated with an individual can be seen as an electronic equivalent of stealing the individual's identity. After having acquired appropriate biometric data identifying an individual, the hacker may impersonate the individual whose identity the hacker acquired. Moreover, biometric data may contain sensitive and private information on health conditions. Hence, the integrity of individuals employing biometric authentication/identification systems must be safeguarded.

As biometrics provide sensitive information about an individual, there are privacy problems related to the management and usage of biometric data. For example, in prior art biometric systems, a user must inevitably trust the biometric systems completely with regard to the integrity of her biometric template. During enrollment—i.e. the initial process when an enrollment authority acquires the biometric template of a user—the user offers her template to an enrollment device of the enrollment authority which stores the template, possibly encrypted, in the system. During verification, the user again offers her template to the system, the stored template is retrieved (and decrypted if required) and matching of the stored and the offered template is effected. It is clear that the user has no control of what is happening to her template and no way of verifying that her template is treated with care and is not leaking from the system. Consequently, she has to trust every enrollment authority and every verifier with the privacy of her template. Although these types of systems are already in use, for example in some airports, the required level of trust in the system by the user makes widespread use of such systems unlikely.

Cryptographic techniques to encrypt or hash the biometric templates and perform the verification (or matching) on the encrypted data such that the real template is never available in the clear can be envisaged. However, cryptographic functions are intentionally designed such that a small change in the input results in a large change in the output. Due to the very nature of biometrics and the measurement errors involved in obtaining the offered template as well as the stored template due to noise-contamination, the offered template will never be exactly the same as the stored template and therefore a matching algorithm should allow for small differences between the two templates. This makes verification based on encrypted templates problematic.

In Match on Card (MoC) systems as described in e.g. "The Match On Card Technology" by Magnus Pettersson, White paper 22 Aug. 2001, a biometric template is stored on a smart card that also has a fingerprint sensor. During verification, a user presents her biometric template (e.g. a fingerprint) to the sensor and the card determines if there is a match between the stored and offered template. The result of the comparison is sent to a verifier. One advantage of this approach is that no templates are centrally stored. However, a biometric template is still stored permanently in the system and if the smart card is lost, an attacker might obtain the template by manipulating the smart card. Although the template is stored in encrypted form and decrypted prior to performing template matching in the card, proper management of the decryption key presents new privacy problems. Further, the verifier has to trust the card completely in the sense that the template matching is completely performed in the card and the verifier is presented with a match confirmation. This may considerably decrease the chances that verifiers will accept the system.

BRIEF SUMMARY OF THE INVENTION

It is an object of the present invention to provide a biometric system for authentication and/or identification which a user can trust in that the system does not store the biometric template of the user. Hence, privacy of the biometric template is provided.

This is attained by a system for verifying the identity of an individual by employing biometric data associated with the individual, which system provides privacy of said biometric data, in accordance with claim 1 and a method of verifying the identity of an individual by employing biometric data associated with the individual, which method provides privacy of said biometric data in accordance with claim 13.

According to a first aspect of the present invention, there is provided a system comprising a verifier, a secure, tamper-proof user device which is trusted by the individual, an enrollment authority and a central storage, wherein the enrollment authority is arranged to store enrollment data at said central storage, the enrollment data being secret and based on a first set of biometric data of the individual. The user device is arranged to receive a second set of biometric data of the individual, to generate secret verification data based on said second set of biometric data and helper data, which helper data is based on the first set of biometric data and related to the enrollment data, and the verifier is arranged to acquire the enrollment data from the central storage, to acquire verification data from the user device and to compare the enrollment data with the verification data to check for correspondence, wherein the identity of the individual is verified if correspondence exists.

According to a second aspect of the present invention, there is provided a method that comprises the steps of acquiring enrollment data, the enrollment data being secret and based on a first set of biometric data of the individual, acquiring verification data that is secret and based on a second set of biometric data of the individual and helper data, which helper data is based on the first set of biometric data of the individual and related to the enrollment data and comparing the enrollment data with the verification data to check for correspondence, wherein the identity of the individual is verified if correspondence exists. Further, processing of the biometric data of the individual, the enrollment data and the verification data is performed in a secure, tamper-proof environment which is trusted by the individual.

A basic idea of the invention is that biometric data of individuals should not be stored in biometric systems, in order to provide privacy and to avoid identity-revealing attacks on the biometric systems. By solving security-related problems concerning biometrics, the acceptance level for biometric identification will increase. In biometric systems, the identity of an individual must be verified depending on the actual purpose of the particular biometric system. Different biometric systems typically have differing purposes for verifying the identity of an individual. For example, one system may provide conditional access to secure buildings or conditional access to digital data (e.g. stored in a computer or removable storage media), whereas another system is employed for identification purposes (e.g. used for charging the identified person for a particular activity). Note that when verification of an individual's identity is performed in the present invention, this verification may imply that authentication of an individual is performed or that identification of an individual is performed. In authentication, the individual claims to have a certain identity and offered data based on a biometric template is compared with stored data (linked to the claimed identity) based on the biometric template, in order to verify correspondence between the offered and stored data. In identification, the offered data is compared with a plurality of stored available data sets, in order to verify correspondence between the offered and stored data. In any case, the offered data is compared to one or more stored data sets. It is clear that the term "verification" may denote either "authentication" or "identification" throughout the application, depending on the context in which the term is used.

When verification is to be performed, a verifier must in some way acquire data that allows the verifier to identify or authenticate an individual. For example, the verifier may actively fetch verification data from a central storage, or passively receive the verification data from the storage. In either case, the verifier acquires enrollment data from the central storage. The enrollment data is secret (to hamper impersonation attacks) and based on a first set of biometric data of the individual. This enrollment data is extracted from the first set of biometric data during an enrollment phase which must be performed in a secure, tamper-proof environment which is trusted by the individual, such that the enrollment data or the biometric data of the individual is not revealed. In the secure environment, it is possible that different sets of enrollment data are extracted from one set of biometric data.

Further, the verifier acquires verification data, which verification data also is secret and based on a second set of biometric data of the individual and helper data. This second set of biometric data is provided by the individual in a verification phase and will typically not be identical to the first set of biometric data that is obtained from the individual during the enrollment phase, even though an identical physical property, for example the iris of the individual, is employed. This is for example due to the fact that when the physical property is measured, there is always random noise present in the measurement, so the outcome of a quantization process to convert an analog property into digital data will differ for different measurements of the same physical property. This may also be due to misalignment of the physical property that is measured or elastic distortion. In order to provide robustness to noise, the secure environment derives the helper data which will be used during verification to achieve noise robustness. Since the helper data is centrally stored, it is considered to be public data. In order to prevent impersonation, the enrollment data derived from the biometric data is statistically independent of the helper data. The helper data is arranged such that unique data can be derived from the biometric data of an individual during the verification as well as during the enrollment.

The helper data W and the enrollment data S are based on the first set of biometric data X of the individual via some appropriate function or algorithm $F_G$ so we have $(W, S) = F_G(X)$. Function $F_G$ might be a randomized function which enables generation of many pairs (W, S) of helper data W and enrollment data S for one single biometric template X. This allows the enrollment data S (and hence also the helper data W) to be different for different enrollment authorities.

The helper data is based on the enrollment data and the first set of biometric data of the individual in that the helper data is chosen such that, when a delta-contracting function is applied to the first set of biometric data and the helper data, the outcome equals the enrollment data. The delta-contracting function has the characteristic that it allows the choice of an appropriate value of the helper data such that any value of biometric data which sufficiently resembles the first set of biometric data results in the same output value, i.e. data which is identical to the enrollment data. As a consequence, $G(X, W) = G(Y, W) = S$, if Y resembles X to a sufficient degree. Hence, the second set of biometric data will, together with the helper data, result in an output which is identical to the enrollment data. Conversely, substantially different biometric data input to the delta-contracting function will result in different outputs. Hence, the helper data is arranged such that, by means of employing the delta-contracting function to the helper data and the second set of biometric data, the verification data equals the enrollment data with very high probability. Moreover, the helper data is arranged such that no information about the enrollment data is revealed by studying the helper data. Note that the creation of the verification data during the verification must be performed in a secure, tamper-proof environment which is trusted by the individual, such that the verification data or the biometric data (i.e. the second set of biometric data) of the individual is not revealed.

Finally, the enrollment data is compared at the verifier with the verification data to check for correspondence. If the enrollment data is identical to the verification data, the verification of the identity of the individual is successful and the biometric system can act accordingly, for example by giving the individual access to a secure building.

The present invention is advantageous for a number of reasons. First, processing of security sensitive information is performed in a secure, tamper-proof environment which is trusted by the individual. This processing, combined with utilization of a helper data scheme, enables set up of a biometric system where the biometric template is available in electronic form only in the secure environment, which typically comes in the form of a tamper-resistant user device employed with a biometric sensor, e.g. a sensor-equipped smart card. Moreover, electronic copies of the biometric templates are not available in the secure environment permanently, but only when the individual offers her template to the sensor. After having derived the enrollment data and the helper data, the biometric data is discarded. This is also true for the biometric data obtained in the verification phase; after having derived the verification data by employing the second set of biometric data, the second set is discarded. This way, in contrast to traditional MoC systems, privacy of the biometric template is maintained even if the secure environment is compromised.

According to an embodiment of the present invention the central storage is arranged to store the helper data and the verifier is arranged to acquire the helper data from the central storage and send it to the user device. If the helper data is stored centrally, the data can be generated either at the user device or at the enrollment authority. Another advantage of having the helper data stored centrally is that all verifiers can be given access to verification data at one single storage. In case the helper data is generated at the user device, the helper data should preferably be stored at the central storage passing through the enrollment authority.

According to another embodiment of the present invention, the user device is arranged to derive the first set of biometric data of the individual, to generate the enrollment data and to send the enrollment data to the enrollment authority. Hence, it is not necessary for the individual to offer her template to the enrollment authority. This is advantageous, as the enrollment authority not necessarily is trustworthy. Although the individual may trust her bank to destroy an electronic copy of the template after enrollment, she may not trust a nightclub or an Internet gambling site to do the same. On the other hand, in accordance with another embodiment of the present invention, the enrollment authority is arranged to derive the first set of biometric data of the individual and to generate the enrollment data. This is advantageous, since the authorization of enrolling individuals is not distributed among user devices, but is maintained at the enrollment authority, which may simplify management of the system.

Further features of, and advantages with, the present invention will become apparent when studying the appended claims and the following description. Those skilled in the art realize that different features of the present invention can be combined to create embodiments other than those described in the following. Further, those skilled in the art will realize that other helper data schemes than the scheme described hereinabove may be employed.

BRIEF DESCRIPTION OF THE SEVERAL VIEWS OF THE DRAWINGS

A detailed description of preferred embodiments of the present invention will be given in the following with reference made to the accompanying drawings, in which.

DETAILED DESCRIPTION OF THE INVENTION

Figure 1:
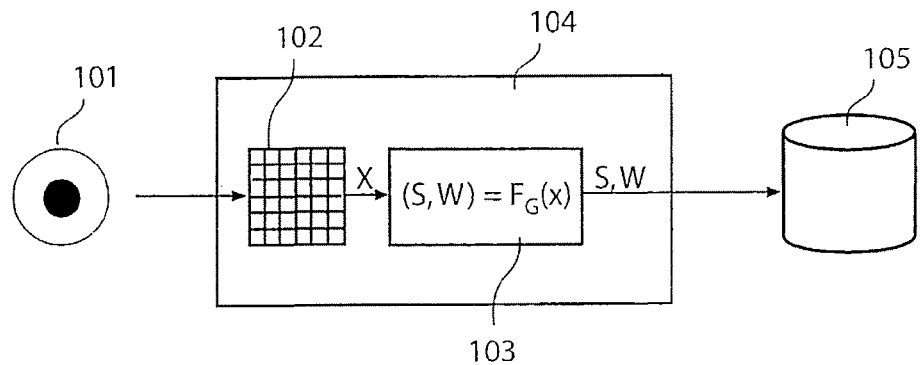
FIG. 1 shows an enrollment path of a principal prior art biometric system.

FIG. 1 shows an enrollment path of a principal prior art biometric system which will be described in the following. In this example, it is presumed that an individual wishes to enroll as a member of a chain of casinos that uses biometric identification (using e.g. the iris 101 of an individual) for access control. The biometric system that is employed is based on a helper data scheme (HDS) as previously described. In order to become a member, the individual has to undergo an enrollment procedure by offering her iris to a sensor 102 arranged in an enrollment device 104 owned by the casino. Although the system uses an HDS by deriving enrollment data S and helper data W in an enrollment processing unit 103 and storing the data in the central storage unit 105, and which system further does not store the biometric template of the individual, it is possible that the enrollment device has been tampered with such that the biometric template X may be eavesdropped. The individual has no way of verifying if the device 104 has been tampered with or not and although a HDS is used, it is still possible that the biometric template leaks from the system, due to manipulation.

Figure 2:
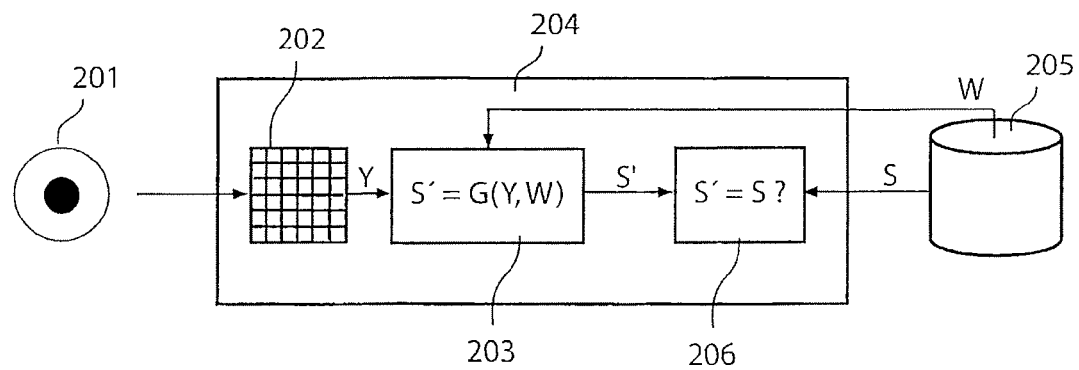
FIG. 2 shows a verification path of a principal prior art biometric system.

Although the enrollment procedure is, in many practical applications, undertaken in a controlled environment which is trusted by the individual, this is not necessarily true for the verification procedure. Turning to FIG. 2, in order to gain access to a casino comprised in the casino chain after the enrollment is completed, the individual has to offer her biometric template Y derived from her iris 201 via a sensor 202 arranged in a verification device 204. A verification processing unit 203 fetches the helper data W stored in the central storage 205 and computes the verification data S' by employing a delta-contracting function. Matching unit 206 compares S with S', and if there is a match, the identity of the individual has been verified, and the individual is given access to the casino. If there is no match, the individual is not given access to the casino. As in FIG. 1, the system may have been manipulated. The verification device 204 might have been tampered with such that the biometric template Y is eavesdropped and again, the user has no way of controlling the verification procedure.

Figure 3:
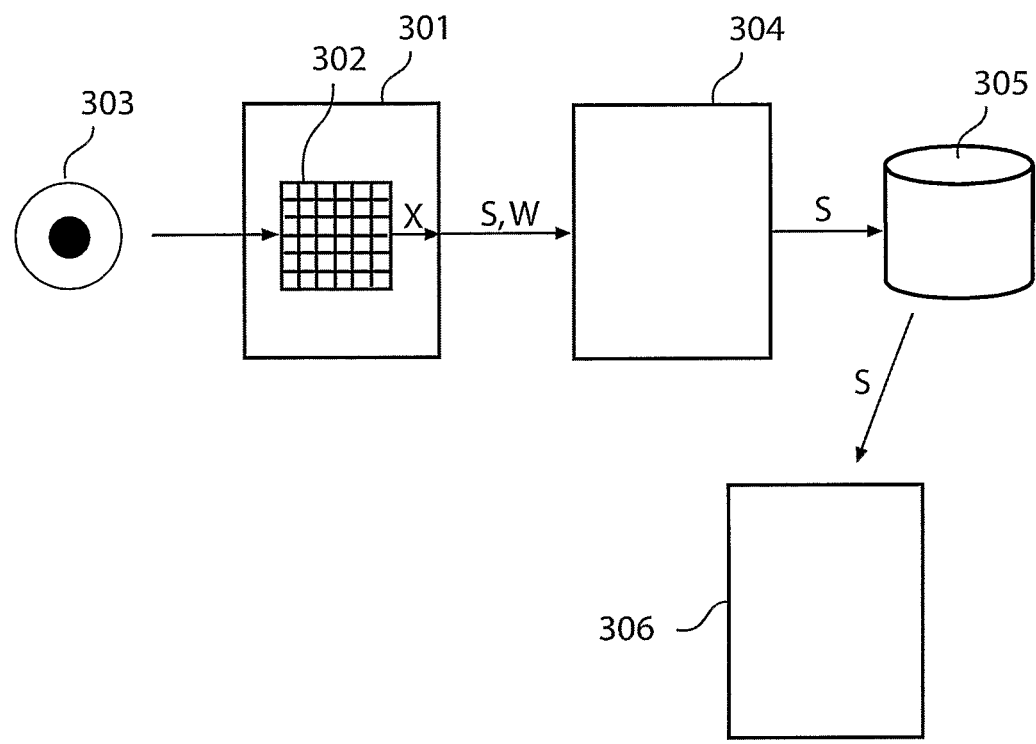
FIG. 3 shows a system for verification of an individual's identity using biometric data associated with the individual in accordance with an embodiment of the present invention.
Figure 4:
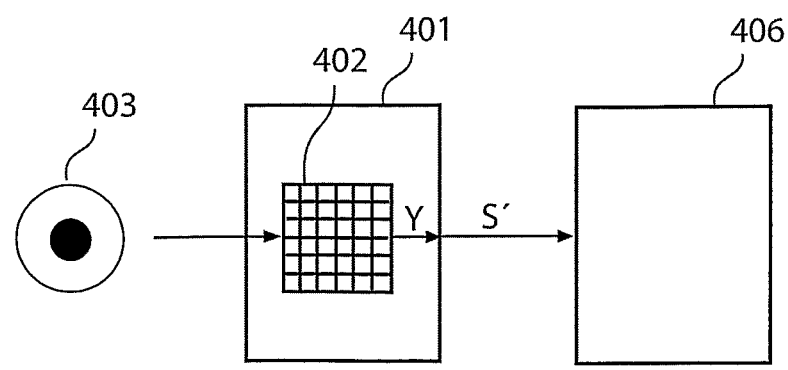
FIG. 4 shows a verification path of a system for verification of an individual's identity using biometric data associated with the individual in accordance with an embodiment of the present invention.

FIG. 3 shows a system for verification of an individual's identity using biometric data associated with the individual, according to an embodiment of the present invention. The system comprises a user device 301 arranged with a sensor 302 for deriving a first biometric template X from a configuration of a specific physical feature 303 (e.g. a fingerprint, an iris, an ear, a face etc.) of the individual, or even from a combination of physical features. The user device must be secure, tamper-proof and hence trusted by the individual. An enrollment authority 304 initially enrolls the individual in the system by storing enrollment data S in a central storage unit 305, which enrollment data subsequently is used by a verifier 306. The enrollment data S is secret (to avoid identity-revealing attacks by analysis of S) and derived, in the embodiment of FIG. 3 at the user device 301 from the first biometric template X. At the time of verification, a second biometric template Y, which typically is a noise-contaminated copy of the first biometric template X, is offered by the individual 403 to the user device 401 via the sensor 402, see FIG. 4. The user device 401 generates secret verification data (S') based on the second set Y of biometric data and helper data W. The helper data W is based on the first set X of biometric data relates to and the enrollment data S. The helper data W is typically calculated such that S=G(X, W), where G is a delta-contracting function. Hence, as W and S are calculated from the template X using a function or algorithm $F_G$ such that (W, S)=$F_G$(X).

The verifier 406 authenticates or identifies the individual by means of the enrollment data S and verification data S' received from the user device 401. Noise-robustness is provided by calculating verification data S' at the user device 401 as S'=G(Y, W). The delta-contracting function has the characteristic that it allows the choice of an appropriate value of the helper data W such that S'=S, if the second set Y of biometric data sufficiently resembles the first set X of biometric data. Hence, if S'=S, verification is successful.

In a practical situation, the enrollment authority may coincide with the verifier, but they may also be distributed. As an example, if the biometric system is used for banking applications, all larger offices of the bank will be allowed to enroll new individuals into the system, such that a distributed enrollment authority is created. If, after enrollment, the individual wishes to withdraw money from such an office while using her biometric data as authentication, this office will assume the role of verifier. On the other hand, if the user makes a payment in a convenience store using her biometric data as authentication, the store will assume the role of the verifier, but it is highly unlikely that the store ever will act as enrollment authority. In this sense, we will use the enrollment authority and the verifier as non-limiting abstract roles.

As can be seen hereinabove, the individual has access to a device that contains a biometric sensor and is capable of computing S'=G(Y, W). In practice, the device could comprise a fingerprint sensor integrated in a smart card or a camera for iris or facial recognition in a mobile phone or a PDA. The fact that the individual may own the user device makes it less likely that the device should be tampered with and is easier for the individual to trust. It is assumed that the individual has obtained the device from a trusted authority (e.g. a bank, a national authority, a government) and that she therefore trusts this device.

Figure 5:
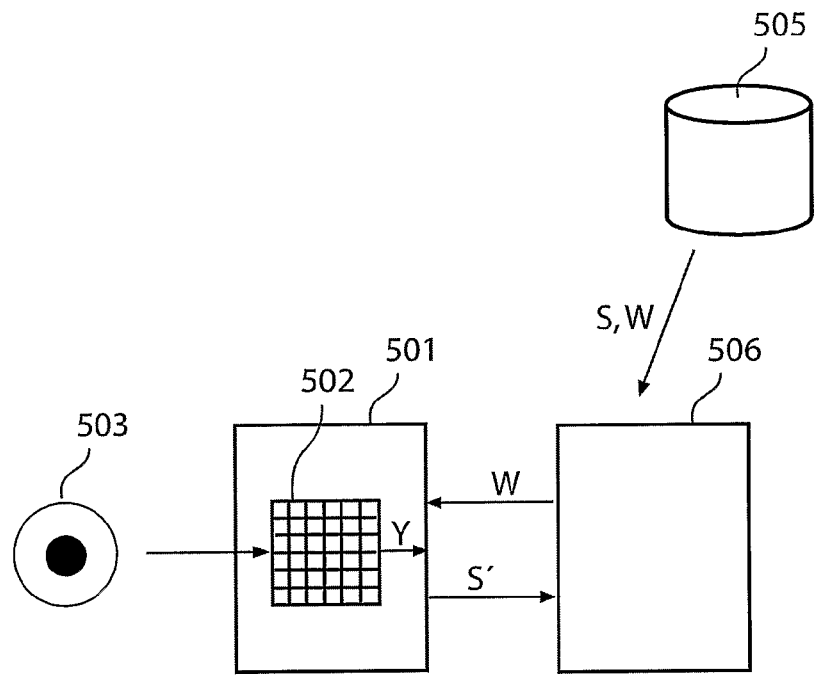
FIG. 5 shows a verification path of a system for verification of an individual's identity using biometric data associated with the individual in accordance with another embodiment of the present invention.

In an embodiment of the invention, which is illustrated in FIG. 5, the helper data W is stored at the central storage 505 by the enrollment authority (not shown), fetched by the verifier 506 and sent to the user device 501 when verification is to be performed. The user device 501 then uses the helper data W received from the verifier 506 and the second template Y (which is received from the individual 503 via the sensor 502) to calculate the verification data S'. Thereafter, S' is compared with S at the verifier 506 to check for a match. In an alternative embodiment, the helper data is not stored at the central storage, but at the user device. In that case, it is not necessary that the verifier fetches the helper data and sends it to the user device, since the user device already is in possession of it.

Figure 6:
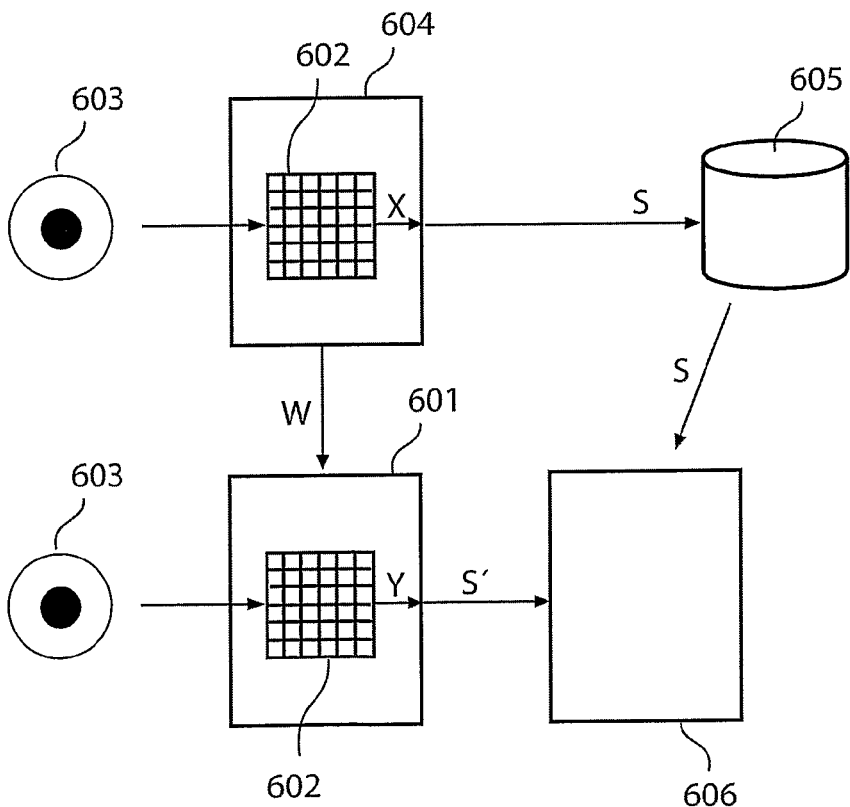
FIG. 6 shows a system for verification of an individual's identity using biometric data associated with the individual in accordance with yet another embodiment of the present invention.

FIG. 6 shows another embodiment of the present invention, in which embodiment the enrollment authority 604 is arranged with a sensor 602 to derive a first biometric template X from a configuration of a specific physical feature 603 of the individual. The enrollment authority 604 stores enrollment data S in a central storage unit 605, which enrollment data subsequently is used by the verifier. The helper data W may be stored in the central storage 605, or alternatively, as shown in FIG. 6, at the user device 601. The verification is performed in the manner described hereinabove; the verifier 606 authenticates or identifies the individual by means of the enrollment data S stored at the central storage 605, and the verification data S' received from the user device 601. If S'=S, verification is successful. It should be noted that the secret enrollment data S and the helper data W is derived at the device with which the enrollment is effected. If the enrollment is effected at the used device as shown in FIG. 3, then the secret enrollment data S and the helper data W is generated at the user device. On the other hand, if the enrollment is effected at the enrollment authority as shown in FIG. 6, then the secret enrollment data S and the helper data W is generated at the enrollment authority. If an enrollment authority generates S and W, the individual will have to offer her template to the enrollment authority, which not necessarily is trustworthy. Although the individual may trust her bank to destroy the electronic copy of the template after enrollment, she may not trust a nightclub or an internet gambling site to do the same.

Communication between devices may be established using any known appropriate communication channel, e.g. a wireless channel employing RF or IR transmission, or a cable employing, for example, a public switched telephone network (PSTN).

Although the helper data W and the enrollment data S are generated either at the user device or the enrollment authority, and stored either at the user device or the verifier in the system described hereinabove, this is not necessarily the case. It is straightforward and obvious to a skilled person to modify the system in accordance with the present invention, such that the helper data W and the enrollment data S are generated partly at the user device and partly at the enrollment authority and may also partly be stored at the user device and partly at the verifier. It is trivial to combine some or all of the described embodiments of the present invention to arrive at such modifications. Further, it is obvious to a skilled person that the data and the communications in the architectures above can be further protected using standard cryptographic techniques such as SHA-1, MD5, AES, DES or RSA. Before any data is exchanged between devices (during enrollment as well as during verification) comprised in the system, a device might want some proof on the authenticity of another other device with which communication is established. For example, during the embodiment described in connection to FIG. 3, it is possible that the enrollment authority must be ensured that a trusted device did generate the enrollment data received. This can be achieved by using public key certificates or, depending on the actual setting, symmetric key techniques. Moreover, in the embodiment of FIG. 3, it is possible that the enrollment authority must be ensured that the user device can be trusted and that it has not been tampered with. Therefore, in many cases, the user device will contain mechanisms that allow the enrollment authority to detect tampering. For example, Physical Uncloneable Functions (PUFs) may be implemented in the system. A PUF is a function that is realized by a physical system, such that the function is easy to evaluate but the physical system is hard to characterize. Depending on the actual setting, communications between devices might have to be secret and authentic. Standard cryptographic techniques that can be used are Secure Authenticated Channels (SACs) based on public key techniques or similar symmetric techniques.

Also note that the enrollment data and the verification data may be cryptographically concealed by means of employing a one-way hash function, or any other appropriate cryptographic function that conceals the enrollment data and verification in a manner such that it is computationally infeasible to create a plain text copy of the enrollment/verification data from the cryptographically concealed copy of the enrollment/ verification data. It is, for example possible to use a keyed one-way hash function, a trapdoor hash function, an asymmetric encryption function or even a symmetric encryption function.

It is clear that the devices comprised in the system of the invention, i.e. the user device, the enrollment authority, the verifier and possibly also the central storage, is arranged with microprocessors or other similar electronic equipment having computing capabilities, for example programmable logic devices such as ASICs, FPGAs CPLDs etc. Further, the microprocessors executes appropriate software stored in memories, on discs or on other suitable media for accomplishing tasks of the present invention.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

What is claimed is:

1. A system for verifying the identity of an individual by employing biometric data associated with the individual, the system providing privacy of said biometric data, the system comprising:
   a verifier;
   a secure, tamper-proof user employed device employed with a biometric sensor, wherein said user employed device is owned and trusted by the individual and is separate and distinct from said verifier;
   an enrollment authority; and
   a central storage, wherein said enrollment authority is arranged to store enrollment data (S) at said central storage, the enrollment data (S) being secret and based on a first set (X) of biometric data of the individual;
   said employed user device is arranged to temporarily receive, with said biometric sensor, a second set (Y) of biometric data of the individual directly from the individual that is not available to the verifier, to generate secret verification data (S') based on said second set (Y) of biometric data and helper data (W), said helper data (W) being based on the first set of (X) biometric data and related to the secret enrollment data (S), the helper data (W) being chosen such that, when a delta-contracting function is applied to the first set (X) of biometric data and the helper data (W), the outcome equals the enrollment data (S); and
   said verifier is arranged to acquire the secret enrollment data (S) from the central storage, to acquire the secret verification data (S') received from the user employed device, wherein communication between said verifier and said user employed device is established using a communication channel, such that the second set (Y) of biometric data of the individual is not revealed from the secret verification data (S') and to compare the secret enrollment data (S) with the secret verification data (S') to check for correspondence, wherein the identity of the individual is verified if correspondence exists.

2. The system according to claim 1, wherein said central storage is arranged to store the helper data (W); and said verifier is arranged to acquire said helper data (W) from the central storage and send said helper data (W) to the user employed device using said communication channel.

3. The system according to claim 2, wherein said user employed device is arranged to generate the helper data (W) and forward the helper data (W) to the enrollment authority using said communication channel, and wherein said enrollment authority is arranged to store the helper data (W) at the central storage.

4. The system according to claim 2, wherein said enrollment authority is arranged to generate the helper data (W) and store it in the central storage.

5. The system according to claim 1, wherein said user employed device is arranged to generate the helper data (W) and store it at the user employed device.

6. The system according to claim 1, wherein said enrollment authority is arranged to generate the helper data (W) and forward to and store on the helper data (W) at the user employed device using said the communication channel.

7. The system according to claim 1, wherein said helper data (W) is generated, and subsequently used in a delta-contracting function.

8. The system according to claim 3, wherein said user employed device is arranged to derive the first set of biometric data (X) of the individual using said biometric sensor, to generate the enrollment data (S), and to send the enrollment data (S) to the enrollment authority.

9. The system according to claim 8, wherein said biometric sensor of said user employed device further is arranged for deriving a biometric template from at least one physical feature of the individual.

10. The system according to claim 4, wherein said enrollment authority is arranged to derive the first set (X) of biometric data of the individual and to generate the enrollment data.

11. The system according to claim 10, wherein said enrollment authority calls upon the biometric sensor to derive a biometric template from at least one physical feature of the individual.

12. The system according to claim 1, wherein the user device comprises a smart card.

13. A method of verifying the identity of an individual by employing biometric data associated with the individual, the method providing privacy of said biometric data, the method comprising:
   acquiring, at a verifier, enrollment data (S) from a central storage, the enrollment data being secret and based on a first set (X) of biometric data of the individual;
   acquiring, at said verifier, verification data (S') and helper data (W) over a communication channel, wherein said verification data (S') is from a user employed device employed with a biometric sensor owned and trusted by the individual, said user employed device being distinct and separate from said verifier, the verification data (S')

being secret and based on a second set (Y) of biometric data of the individual and said helper data (W) directly from the user employed device of the individual not available to the verifier, and wherein aid helper data (W) is based on the first set (X) of biometric data of the individual and related to the enrollment data (S), the helper data (W) being chosen such that, when a delta-contracting function is applied to the first set (X) of biometric data and the helper data (W), the outcome equals the enrollment data (S); and comparing the enrollment data (S) with the verification data (S') to check for correspondence, wherein the identity of the individual is verified if correspondence exists;

wherein processing of the first set (X) and the second set (Y) of biometric data of the individual, the enrollment data (S) and the verification data (S') is performed in a secure, tamper-proof environment which is trusted by the individual.

14. The method according to claim 13, further comprising:
acquiring said helper data (W); and
sending said helper data (W) to the secure, tamper-proof environment which is trusted by the individual.

15. The method according to claim 13, further comprising:
generating the helper data (W) at the secure, tamper-proof environment which is trusted by the individual; and
forwarding the helper data (W) to an enrollment authority.

16. The method according to claim 14, further comprising:
generating the helper data (W) at said enrollment authority.

17. The method according to claim 13, wherein said helper data (W) is generated, and subsequently used in a delta-contracting function.

18. The method according to claim 15, wherein deriving the first set (X) of biometric data of the individual, generating the enrollment data (S), and sending the enrollment data (S) to the enrollment authority is performed at the secure, tamper-proof environment which is trusted by the individual.

19. The method according to claim 16, wherein deriving the first set (X) of biometric data of the individual and generating the enrollment data (S) is performed at said enrollment authority.

20. A computer program, embodied in a non-transitory computer readable medium, for verifying the identity of an individual by employing biometric data associated with the individual, comprising:

acquiring enrollment data (S) from a central storage, the enrollment data (S) being secret and based on a first set (X) of biometric data of the individual;

acquiring verification data (S') and helper data (W) over a communication channel, said verification data (S') from a user employed device employed with a biometric sensor owned and trusted by the individual, said user employed device being separate and distinct from said computer program, the verification data (S') being secret and based on a second set (Y) of biometric data of the individual not available to the verifier and said helper data (X), and wherein said helper data (W) is based on the first set (X) of biometric data of the individual and related to the enrollment data (S), said helper data (W) being chosen such that, when a delta-contracting function is applied to the first set (X) of biometric data and said helper data (W), the outcome equals the enrollment data (S); and comparing the enrollment data (S) with the verification data (S') to check for correspondence, wherein the identity of the individual is verified if correspondence exists;

wherein processing of the first set (X) and the second set (Y) of biometric data of the individual, the enrollment data (S) and the verification data (S') is performed in a secure, tamper-proof environment which is trusted by the individual.

* * * * *